UNITED STATES PATENT OFFICE.

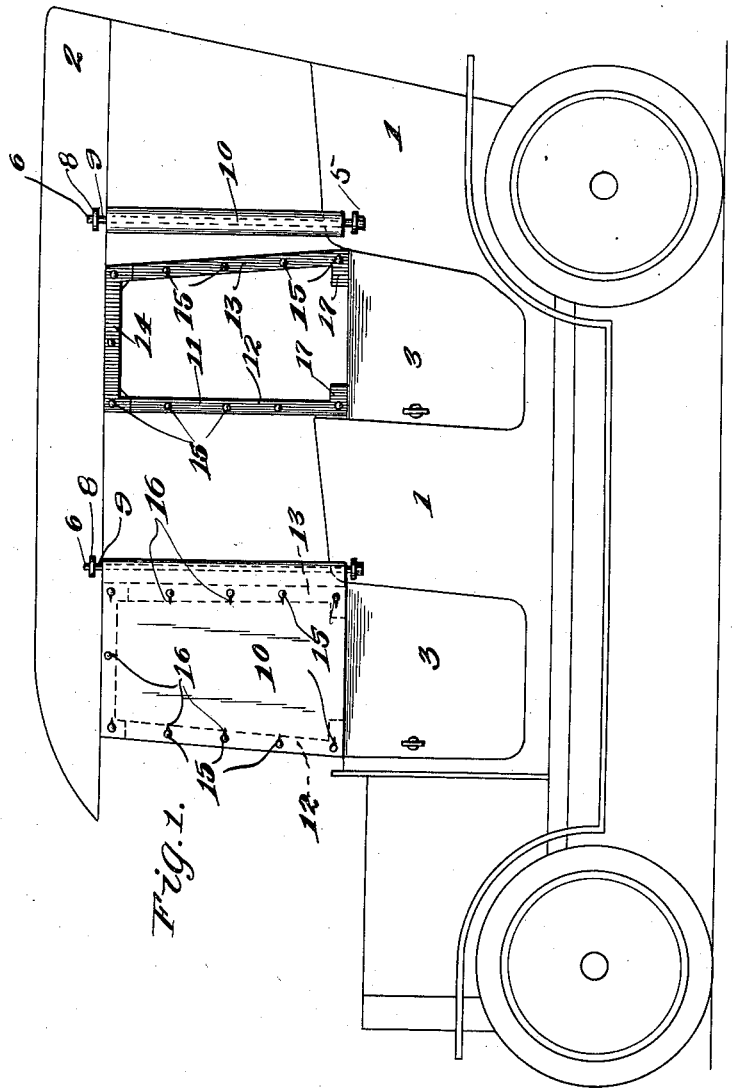

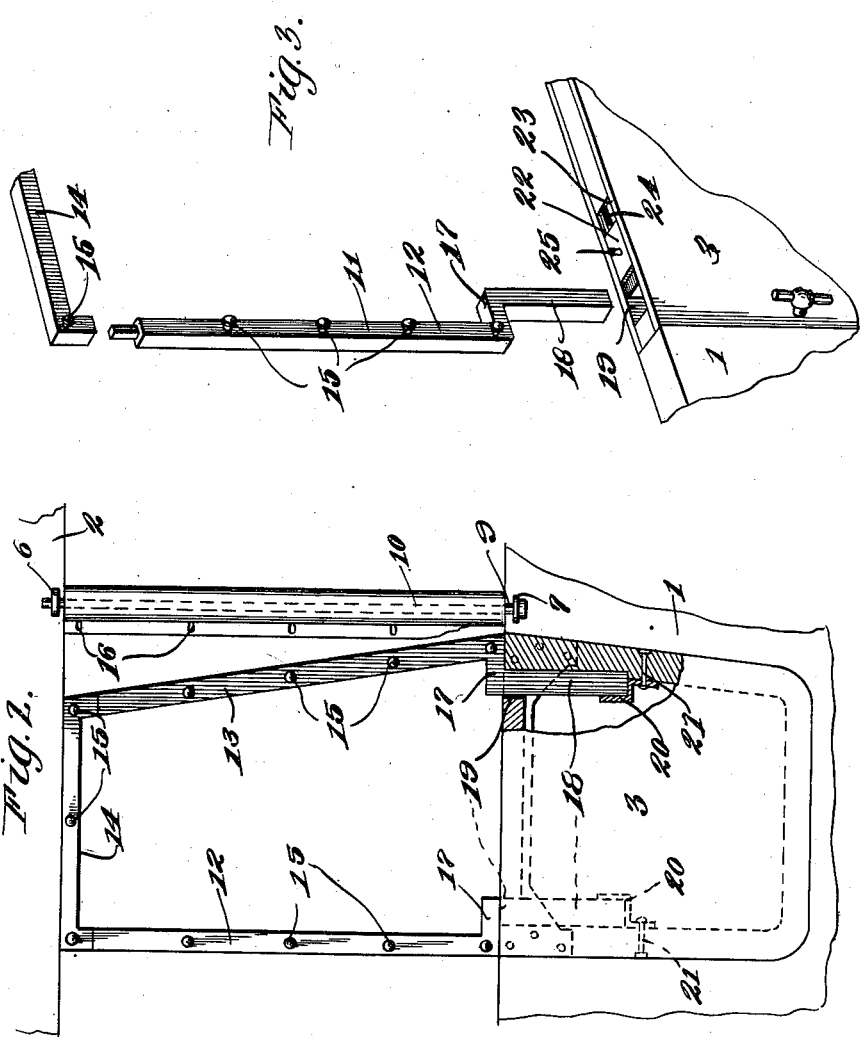

OLIVER L. WHITE, OF ALPHA, NORTH DAKOTA.

STORM-CURTAIN.

1,136,570.  Specification of Letters Patent.  Patented Apr. 20, 1915.

Application filed May 13, 1913. Serial No. 767,370.

*To all whom it may concern:*

Be it known that I, OLIVER L. WHITE, a citizen of the United States, residing at Alpha, in the county of Golden Valley and State of North Dakota, have invented certain new and useful Improvements in Storm-Curtains, of which the following is a specification.

This invention relates to improvements in storm curtains and more particularly to a side curtain for automobiles, which is adapted to close the space above the doors of the car.

The primary object of this invention is the provision of a storm or side curtain for automobiles, which may, at the option of the person riding in the car, form a closure for the opening or space in the side curtains which are left immediately above the doors of the car and curtains which will form a neat appearing and practical storm proof protector or closure for this opening.

Another object of this invention is to construct the curtains and their supporting frames in such a manner and to connect the supporting frames to the doors of the car so that the curtains will not obstruct or in any way hinder the opening or closing of the doors or persons entering or getting out of the machine.

A still further object of this invention is the provision of curtains of this nature which may be installed or mounted upon any make of automobiles now in use, other than those which have close bodies such as limousines, electric coupés or the like without necessitating extensive alterations to the machine.

With the foregoing and other objects in view, this invention consists in such novel features of construction, combination and arrangement of parts as will be hereinafter more fully described, illustrated in the accompanying drawings and claimed.

In describing this invention in detail, reference will be had to the accompanying drawings wherein like characters denote like or corresponding parts throughout the several views and in which:

Figure 1 is a side elevation of an automobile showing the improved frame curtains attached thereto; Fig. 2 is an enlarged detail view of a portion of the inside of an automobile showing the supporting frame for the curtain and the manner for attaching the frame to the machine; Fig. 3 is a detail perspective view of a portion of an automobile door and the frame for supporting the curtain.

In referring to the drawings by numeral, 1 designates the body of an automobile of any make now upon the market having a folding or collapsible top 2 mounted thereupon. The body 1 of the automobile is provided with the usual type of doors 3. Secured to the body 1 as at 5, and to the top 2 as at 6 are brackets 7 and 8 which have a curtain roller 9 mounted therein. The curtain roller 9 has mounted thereupon in the usual manner, a curtain 10 which is constructed of the usual type of water-proof material that is used ordinarily in the construction of frame curtains for various types of vehicles. The curtain 10 is secured to the roller 9 in any suitable manner and the roller is provided with the usual type of spring mechanism mounted therein so as to roll the curtain thereupon whenever the tension of the spring is in any manner released as is commonly the case in window shades or the like.

A frame 11 which is composed of the two side pieces 12 and 13 and the top or cross piece 14 is mounted upon the door 3 of the machine and has a plurality of buttons 15 arranged about and formed upon its outer surface. These buttons 15 are inserted through button-holes or eyelets 16 in the curtain 10 when the same is unrolled so as to form a closure for the opening in the side curtains immediately above the doors 3 as is illustrated by the front curtain in Fig. 1 of the drawings. These buttons 15 co-act with eyelets 16 to hold the curtain 10 in an unrolled position. In providing a plurality of these buttons mounted upon the frame as they are shown in the drawings, the curtain will be held securely against the frame 11 and practically storm and wind proof as there will be no small openings for the wind or rain to enter where the curtain is attached to the frame.

The lower portion of the side pieces 12 and 13 of the frame 11 extend inwardly and parallel to the cross piece 14 at 17 and also have a portion 18 extending downwardly at right angles to the portion 17, as is clearly illustrated in Figs. 2 and 3 of the drawings. The portion 17 of the side pieces 12 and 13 rest upon the upper edge of the door of the car, while the portion 18 extends downwardly into the door through openings 19 formed in the upper side of the door. Suitable brackets 20 are securely attached to poles of the door as at 21 and form a support or rest for the lower end of the sections 18. A small closure 22 is slidably mounted within a cut out portion 23 in the top of the door 3 and is normally held over the opening 19 by a coil spring 24 which is disposed between one end and the small closure 22 of the inner shoulder of the cut out portion 23. When the portions 18 of the sides 12 and 13 are inserted within the openings 19, the closure 22 is held from over the openings 19, against the pressure of the spring 24. A handle 25 is formed upon the upper portion of the closure 22 to aid in the manipulation of the same.

When the curtain 10 is unrolled and attached to the frame 11 as is illustrated by the front curtain of automobile shown in Fig. 1 of the drawings, the same will in no way hinder the opening and closing of the door 3 in that it is a pliable material and the frame 11, to which the curtain is secured by means of the buttons 15, is mounted upon the door so that it will swing with the same. The mounting of the curtain in the manner which has heretofore been set forth and shown in the drawings will permit the action of the door of the machine in the same manner as if it were not attached thereto also it will form a practically storm proof closure for this portion of the automobile.

Should it be desired any type of transparent means may be inserted in the curtain so as to form a window through which the persons seated within the automobile may see out of the machine if they desire to do so.

In practical fields certain minor features of construction, combination and arrangement of parts may necessitate alterations to which the patentee is entitled provided such alterations are comprehended within the scope of what is claimed.

I claim—

1. The combination with a vehicle body having a curtain roller attached thereto, of a substantially inverted U-shaped frame for the door of said vehicle comprising upright members to which the curtain is adapted to be attached, a member for connecting the tops thereof, downwardly extending offset portions formed on the lower ends of said member for engagement in openings formed in the vehicle door, brackets for supporting said offset portions within the door, and spring actuated members for closing said openings when the frame is removed.

2. The combination with a vehicle body having a curtain roller attached thereto, a door carried by said body, said door having an opening formed therein, of a substantially inverted U-shaped frame for the door of said vehicle comprising upright members to which the curtain is adapted to be attached, a downwardly extending offset portion formed on the lower end of one of said members for engagement with said opening, and a plate slidably mounted in said door for closing said openings upon removal of said frame.

3. The combination with a vehicle body having a curtain roller attached thereto, a door carried by said body, said door having an opening formed therein, of a substantially inverted U-shaped frame for the door of said vehicle comprising upright members to which the curtain is adapted to be attached, a downwardly extending offset portion formed on the lower end of said members for engagement with said openings, a plate slidably mounted in said door for closing said openings upon removal of said frame, and a spring for exerting pressure to normally hold said plate in position to cover said opening.

In testimony whereof I affix my signature in presence of two witnesses.

OLIVER L. WHITE.

Witnesses:
M. H. NEWELL,
R. G. SHEAR.